US007860873B2

United States Patent
Campbell

(10) Patent No.: US 7,860,873 B2
(45) Date of Patent: Dec. 28, 2010

(54) SYSTEM AND METHOD FOR AUTOMATIC TERMINOLOGY DISCOVERY

(75) Inventor: Christopher S. Campbell, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 10/902,584

(22) Filed: Jul. 30, 2004

(65) Prior Publication Data

US 2006/0026204 A1  Feb. 2, 2006

(51) Int. Cl.
 *G06F 7/00* (2006.01)
 *G06F 17/30* (2006.01)
(52) U.S. Cl. ...................................... 707/758
(58) Field of Classification Search ............. 707/1–200, 707/758, 999.1; 704/1–10
See application file for complete search history.

(56) References Cited

U.S. PATENT DOCUMENTS

| | | | |
|---|---|---|---|
| 5,696,981 A | 12/1997 | Shovers | 395/760 |
| RE35,861 E | 7/1998 | Queen | 395/772 |
| 6,101,515 A | 8/2000 | Wical et al. | 707/531 |
| 6,173,253 B1 | 1/2001 | Abe et al. | 704/10 |
| 6,212,494 B1 | 4/2001 | Boguraev | 704/9 |
| 6,236,958 B1 | 5/2001 | Lange et al. | 704/8 |
| 6,282,508 B1 * | 8/2001 | Kimura et al. | 704/10 |
| 6,332,143 B1 | 12/2001 | Chase | 707/100 |
| 6,539,376 B1 | 3/2003 | Sundaresan et al. | 707/5 |
| 6,632,251 B1 * | 10/2003 | Rutten et al. | 715/530 |
| 6,665,659 B1 * | 12/2003 | Logan | 707/3 |
| 6,876,963 B1 * | 4/2005 | Miyahira et al. | 704/4 |
| 7,200,606 B2 * | 4/2007 | Elkan | 707/102 |
| 2001/0047254 A1 | 11/2001 | Rising, III et al. | 704/9 |
| 2002/0087326 A1 | 7/2002 | Lee et al. | 704/270.1 |

(Continued)

OTHER PUBLICATIONS

A Data Dictionary as a Lexicon: An Application of Linguistics in Information Systems J.F.M. Burg, R.P. van de Riet, S.C. Chang, CIKM, Nov. 1993, D.C., USA.*

(Continued)

*Primary Examiner*—John R. Cottingham
*Assistant Examiner*—Kimberly Lovel
(74) *Attorney, Agent, or Firm*—IP Authority, LLC; Ramraj Soundararajan; Daniel Johnson

(57) ABSTRACT

A system and method for discovering terminology unique to a distinct subset of a general population, is provided. Terminology comprised of new terms as well as unique and obscure usages of previously known terms is determined by creating a common language usage (CLU) dictionary comprising terms, definitions corresponding to term usages, and frequencies corresponding to term usage, from a collection of documents intended for a general audience. In a similar manner, a group dictionary is prepared for a distinct subset and both dictionaries are subsequently compared to determine: the existence of terms not shared in common; differences in usage of terms shared in common; and disparities in frequencies of usages of terms shared in common. Such a comparison highlights differences between communications of a general population and a distinct subset, as well as serves to establish terminology that is unique to a particular, distinct subset of the general population.

12 Claims, 3 Drawing Sheets

U.S. PATENT DOCUMENTS

| | | | |
|---|---|---|---|
| 2003/0061026 A1* | 3/2003 | Umpleby et al. | 704/8 |
| 2003/0061570 A1* | 3/2003 | Hatori et al. | 715/530 |
| 2003/0131319 A1 | 7/2003 | Hintz | 715/532 |
| 2004/0064304 A1* | 4/2004 | Dehlinger et al. | 704/9 |
| 2004/0064438 A1* | 4/2004 | Kostoff | 707/1 |
| 2004/0107088 A1* | 6/2004 | Budzinski | 704/10 |
| 2005/0138056 A1* | 6/2005 | Stefik et al. | 707/102 |
| 2005/0165736 A1* | 7/2005 | Oosta | 707/2 |
| 2005/0234709 A1* | 10/2005 | Klavans et al. | 704/10 |

OTHER PUBLICATIONS

"Methods of Automatic Term Recognition;" Kageura et al.; *Terminology*; vol. 3, No. 2; 1996; pp. 259-289.

"A New Readability Yardstick;" Flesch, Rudolf; *Journal of Applied Psychology*; vol. 32, No. 3, Jun. 1948; pp. 221-233.

"Technical Terminology: Some Linguistic Properties and an Algorithm for Identification in Text;" Justeson et al.; *Natural Language Engineering*; vol. 1, No. 1; 1995; pp. 9-27.

* cited by examiner

SYSTEM AND METHOD FOR AUTOMATIC TERMINOLOGY DISCOVERY

BACKGROUND OF THE INVENTION

1. Field of Invention

The present invention relates generally to the field of natural language processing. More specifically, the present invention is related to the discovery of terminology from comparative and contextual usage.

2. Discussion of Prior Art

Terminology, defined as the grouping of words through the combination of several common and possibly uncommon words in a particular order, is primarily based on a contextual configuration and usage. For example, the word groupings "hard drive" and "entropy minimization technique" are combinations of common and uncommon words creating a term for the representation of a new concept or idea. A term such as hard drive, once it is used often enough, may find its way into common usage in the general population and thus may no longer qualify as technical terminology. The latter term, "entropy minimization technique", combines a pre-existing term, entropy, with other common words to create a new term.

In other cases, terminology is produced by creating a single word that has not previously existed. This is sometimes accomplished by combining morphemes, or meaningful subsegments of words. For example, the term hyperlink combines the morpheme hyper, meaning above or beyond, with the morpheme link, which means to connect.

Terminology is also determined by contextual usage of commonly used words in various fields and disciplines to mean something slightly different or to have a completely new definition than that which is commonly understood by general populations. For example, in computer terminology, mouse refers to a pointer style input device. By contrast, it is understood to be a small furry rodent by the general population. In academic fields, particularly the natural sciences, technical terminology is created by combining the discoverer's name with another word (e.g., Nash equilibrium after the famous mathematician John Nash) or by combining word morphemes from other languages such as Latin (e.g., *Acer saccharum* for sugar maple). In medicine, new terms are created to describe newly discovered diseases and may be created by using the name of the first patient found with the illness (e.g., Lou Gehrig's disease) or by using the name of the doctor discovering the disease (e.g., Raynaud's disease after A. G. Maurice Raynaud). Finally, some terminology develops as an acronym and evolves into popular use as a word. For example, the word radar was originally the acronym R.A.D.A.R. which stands for Radio Detection and Ranging. Some computer acronyms are close to becoming words. One such acronym is G.U.I. (Graphical User Interface) which is already pronounced as if it were a word (i.e., like "gooey").

Common terminology is generally used to improve communication between members affiliated with a group specified by a task, idea, or profession. This improvement is realized because terminology acts as a handle to a long description of an idea, thereby reducing the number of words needed to communicate an idea. In specified groups that communicate certain ideas and concepts frequently, terminology is useful for efficient communications and serves as a common ground for information exchange.

However, a difficulty lies in outsiders attempting to understand communications between members affiliated with a particular group; they may have trouble learning what these terms mean or even what the terminology is for the particular group. Likewise, two groups that have worked independently for some time might develop their own terminology and then have trouble collaborating because of the necessity of sorting out the terminology of common ground ideas and concepts between the groups. In addition, the use of language evolves and changes over time; the understanding of terminology of a group at one point in time does not necessarily guarantee an understanding of the terminology of the same group at a later point in time.

In one scenario, a team of biologists researching gene influence on a particular metabolic process for protein synthesis may choose to consult molecular geneticists or molecular genetics references on relevant issues. However, they will quickly become limited by a great deal of unfamiliar terminology in the literature and references they have chosen to consult; they may not even recognize the relevance of a particular reference if foreign terminology becomes an influencing factor. In another scenario, a company may wish to send operations to an affiliate in another part of the country. The use of terminology and "in-house" words may create communication problems in how affiliates create contracts and agreements, and also may create communication problems in how an affiliate to which work is sent provides services and responds to requests. By learning the terminology of a company before an engagement, an affiliate to which work is sent improves its ability to provide services and contract terms. Language use and word usage are defined as how a word is presented in an expression regarding its association with other words. (How a word is used in an expression constructed specifically to communicate with a particular subset of members, is a goal of the present invention. In the present invention, terminology discovery illustrates how, based on word usage, language use, and context, members of a specified subset communicate differently from members of a population at-large).

According to the non-patent literature entitled "Methods of Automatic Term Recognition," by Kageura and Umino, current approaches to automatic term recognition (ATR) in mining of text literature include an information retrieval (IR) approach, a linguistic approach, and a statistical approach. An IR approach finds terms in a given set of documents by a measure of term frequency or weighted term frequency, thus facilitating document organization by category. Documents sharing common categories have a high frequency of a common set of terms and a low frequency of terms that are in documents of other categories; term frequency is therefore useful for classifying documents. However, the relationship between term frequency and technical terminology is less clear; current approaches are limited in their provision of identifiable or unique distributional characteristics of technical terminology.

A linguistic approach involves the use of language grammar models to find patterns of grammatical constructs (e.g. parts of speech, syntactic structure) that indicate terminology. For example, the non-patent literature entitled "Technical Terminology: Some Linguistic Properties and an Algorithm for Identification in Text," by Justeson and Katz, reports that technical terms are used more formally than other terms so that they only occur in a few different forms of noun phrases. This approach is limited by its application solely to complex, multi-word terms and to formal terms similar to those used in scientific literature. Furthermore, it is necessary for text to be manually tagged for grammatical constructs before linguistic processing can begin.

The last of these approaches, a statistical approach, attempts to find multi-word sequences that are possibly complex technical terms using various methods, most of which are based on frequency of specific words and word co-occurrences (e.g., bi-grams or n-grams) in a set of documents. While this method is highly useful for finding unique, complex terms in a given corpus of documents, it is difficult to ascertain whether these complex terms are actually technical terms, and not more generally, commonly used terms. Thus, a statistical approach incurs the same limitations as an IR approach. In addition, it is limited in its provision for a way to find simple, single-word terms or a way to disambiguate different contextual uses of terminology.

While ATR approaches are able to provide information and statistics about the text in documents, ATR approaches are limited in their ability to find types of terminology, indicated by either, or both, a new or different usage or a new word, in a document collection. This is because technical terminology is not determined solely by the frequencies of terms, frequencies of term co-occurrences, or patterns of grammatical constructs. (According to the present invention, technical terminology is determined by the usage of a word by a definable audience or group that is significantly different from the way a word is commonly used by the general population. Technical terminology is also defined, of course, as the use of a new term).

U.S. Pat. No. 6,101,515, to Wical et al., discloses a system for automatically determining the meaning of a term using a collection of documents that have been categorized by another system. Each term found is matched to a category providing the meaning of the term. Limitations of the disclosed approach include the necessity of deciding what the terms are prior to processing, which would require a great deal of manual effort. Another limitation lies in the fact that categories or semantic topics are determined by a separate system; therefore, how well the terms are specified depends heavily on the classification algorithm and the quality of the document database used. For example, some terms may be about subtle topics or may make fine distinctions that can not be automatically detected from the documents used. Furthermore, categories and terms may not have a simple one-to-one relationship as is assumed in the disclosed approach; there may be several terms used to express several concepts that are all associated with a particular topic.

Both U.S. Pat. No. 6,212,494 B1, to Boguraev, and the non-patent literature entitled "Technical Terminology: Some Linguistic Properties and an Algorithm for Identification in Text," by Justeson et al., disclose linguistic approaches requiring the use of parts of speech, syntax, and rules of grammar to analyze the context of a potential term to help identify terminology. These approaches are limited by their dependence on linguistic constructs to effectively "reverse engineer" the construction of terminology as it appears in written text.

Whatever the precise merits, features, and advantages of the above cited references, none of them achieves or fulfills the purposes of the present invention.

SUMMARY OF THE INVENTION

The system and method of the present invention provides for terminology discovery based on cognitive differences in language use of at least two different groups of language users. Cognitive differences are determined through a discrepancy analysis of language as it is used in expressions made by members of a specified subset of a general population of language users with respect to language as currently used by members of the entire, general population. A specified subset is comprised of a relatively few number of homogenous members and is either distinct or substantively independent from the diverse population to which it is compared. A comparison to a diverse population is a standard for "common ground" concepts and terms; in other words, a majority of the population commonly expects to come across and similarly understand such concepts and terms.

A comparative analysis of language expressions between an entire population and a smaller subset results not only in the discovery of new terms, but also in the discovery of different, unexpected language usage of previously known terms. Therefore, the present invention provides for discovery of both formal terminology as used in scientific disciplines as well as specialized, technical usage of common words by enterprises and other organizations. For example, in specialized computer terminology, "mouse" refers to a pointer-style input device; although the term has another pre-existing meaning of small furry rodent, it has obtained a specialized usage by a specified subset of the population (i.e., people who are computer-literate). As a corresponding example of scientific terminology, "brachioradialis" is a scientific term referring to the muscles of the forearm and as such, did not exist before it was coined to describe this particular concept.

In the present invention, terms from a specialized, subset database of communications are compared with matching terms, if a matching term exists, from a common language usage (CLU) dictionary. A CLU dictionary is a listing of definitions for terms found in a general population database of communications; such communications are from sources considered indicative of language expressions made by a general population. If a matching term is not found in a CLU dictionary, the term is determined to be terminology unique to the specified subset. Otherwise, if a matching term exists, a context is extracted from the specified database of communications, and is compared to usage definitions for matching terms in a CLU dictionary. If extracted context is sufficiently different from these usage definitions, the term is marked as being possibly unique terminology. Terms that are used in contexts that are less frequently-occurring, as defined by a low frequency of usage in a CLU dictionary, are also marked; such words constitute situations of unexpected word usage. Thus, the need for a classification and categorization system is obviated.

DESCRIPTION OF THE PREFERRED EMBODIMENTS

Figure 1:
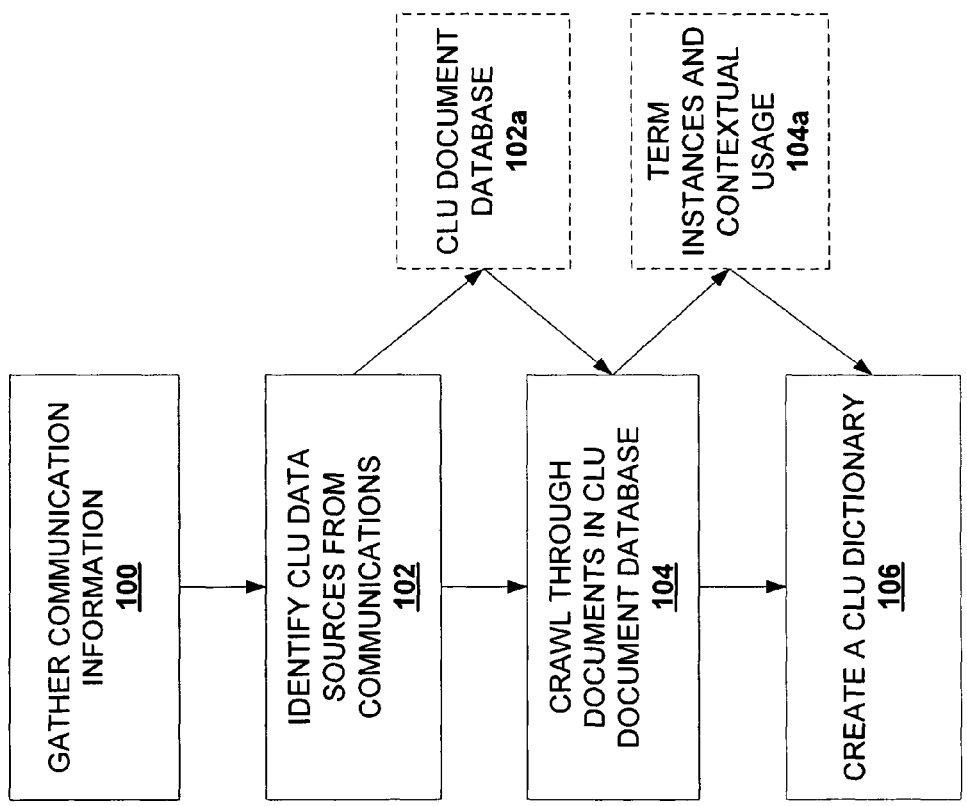
FIG. 1 illustrates the process to create a Common Language Usage (CLU) dictionary.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Shown in FIG. 1 is a general flow diagram for creating a common language usage (CLU) dictionary. In step 100, a database of communications, either written or transcribed from speech, is gathered based on a large variety of topics and intended for a general audience with an average reading level. Prose text from sources considered indicative of language expressions made by a general population, including but not limited to: web pages, telephone transcripts, instant messaging text, and electronic mail, is provided as input. Initially, information sources having instances of "common" language, defined as language typically used in documents meant for public consumption, large circulation publications, and personal communications, are filtered and extracted in step 102. One method to find documents and sources that use common language is to calculate the Flesch ease of reading index: calculating the school grade-level for which documents and sources were intended. A lower Flesch ease of reading index, and therefore a lower grade level, typically indicates information for probable mass consumption. Documents associated with each CLU source as well as each individual CLU document are the basis for a CLU document database 102a, which is provided as an output of step 102. For example, if "The Washington Post" newspaper was determined a CLU source, then all the articles from the newspaper would become a part of the CLU document database. If a single webpage was classified as using common language, then that individual webpage would also become a part of the CLU document database 102a.

The CLU document database 102a determined in step 102 is subsequently provided as an input to step 104, in which common language documents and sources are crawled to create a common language list comprised of terms and contextual instances. A stop-word list prohibits common articles of speech (e.g., a, an, the) from being added to the common language list of terms and context instances. The common language list 104a output as a result of step 104 is then processed in step 106 and, for each term and contextual instance entry that is listed, at least one dictionary entry comprising a definition is created. In one embodiment, definitions are created by aggregating context instances of term usage and applying a clustering algorithm, thus grouping contextual instances according to similarity. Each group subsequently corresponds to a unique definition. Different statistical methods for clustering and classification are used in other embodiments. Output of the CLU generation process is a CLU dictionary, rank-ordered according to frequency of usage, comprising extracted terms and an associated definition or definitions for each term.

In one embodiment, context is determined by a local context (e.g., a current paragraph) and a global context (e.g., a section of a document) taken together, defining the use of a term. Crawling through filtered CLU documents enables a contextualization of a given term through a relatively large number of instances. Context is also defined as lexical units (e.g., words, morphemes, tri-grams) surrounding a term, within a specified distance (e.g., a paragraph, two hundred words, etc.). In another embodiment, multiple levels of increasingly large contextual size, for example local context and global context, are weighted according to a priori informational value.

Given sufficient context, it is possible to determine usage, specifically by distinguishing between the two uses of a word. For example, the verb "fired" in the following two instances, "fired from a gun" and "fired from a job," has similar usage in each instance. In each instance, the verb "fired" is intended to mean "to discharge." However, in a third instance, "fired in a kiln," the verb "fired" has a different usage and is intended to mean "to apply fire to an object" and is part of the process of pottery. Lexical units in context associated with instances of a particular word connote the usage of the particular word; for example, the word "kiln" provides enough context in a particular instance to determine the usage of the verb "fired." Given a statistically significant sample, usages of a particular word are analyzed for different meanings, additional definitions are determined, and a plurality of definitions is added to a CLU dictionary. For example, assuming three instances of the verb "fired" is statistically significant, the CLU dictionary adds an entry for the word "fired" along with two definitions, "to discharge" and "to apply fire," corresponding to two different usages.

Terms that consist of several common words put together are detected by comparing the term scores for adjacent words and identifying a chain. A chain is a group of more common words that, when aggregated, are used as terminology. For example, "business process re-engineering" is a term used by members of the business consulting community. If these terms are consistently observed as occurring consecutively in an atypical context of use, they are merged together into a single term. Plural terms comprised of more than one common term are identified after single-term terminology discovery; it is necessary to ensure that each single term comprising the plurality is not an instance of specialized terminology, in and of itself. In one embodiment, additional information about single term associations is obtained by calculating the frequency of co-occurrences in group-specific documents. A relatively high frequency would indicate a possible association whereas a relatively low frequency would supply no additional, useful information.

Figure 2:
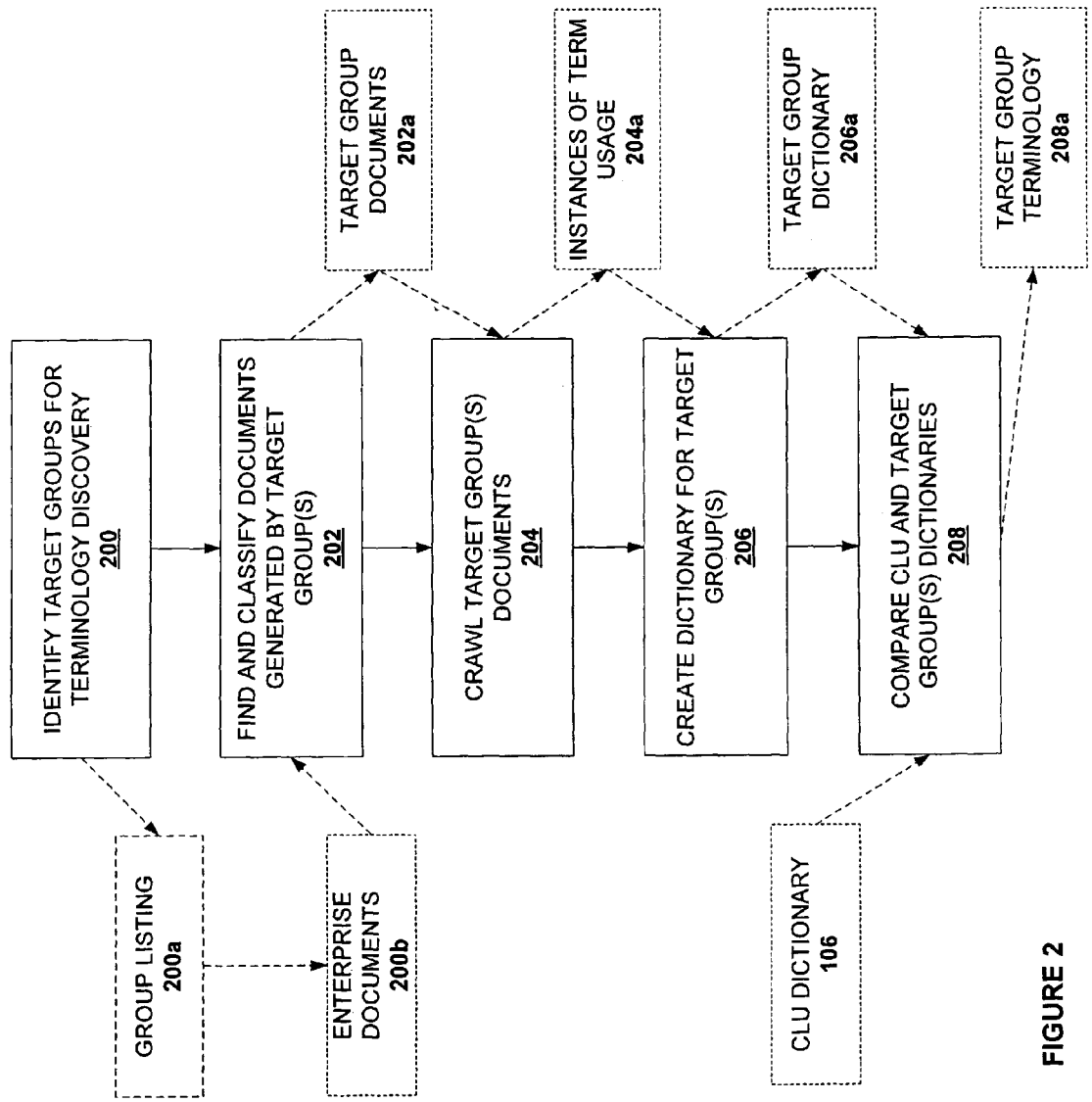
FIG. 2 illustrates the generation of terminology for a group or audience.

Referring now to FIG. 2, the process for the generation of a specialized group of terminology is shown. Similar to the process of generating a CLU dictionary, a set of documents selected from a specialized database is used to produce a dictionary of term usage for a particular specialized group 200a (e.g., an enterprise). Such a specialized database represents a collection of documents 200b produced for a definable audience first identified in step 200; audiences include, but are not limited to: an enterprise, a special interest group, a scientific field, a government agency, and a group organized around a topic, activity, formal organization, ability, or characteristic. Identified groups for which terminology is to be generated are added to a database of target groups and a database of enterprise documents are searched, in step 202, to find and classify documents associated with the identified target group. Documents classified as being associated with the identified target group 202a in step 202 are crawled in step 204 to output terms and contextual instances of usage 204a. For each term and contextual usage, a definition is determined. As a result of step 206, a specialized dictionary unique to the identified target group or groups is produced 206a. Following in step 208, the specialized dictionary or dictionaries are then compared to a previously generated CLU dictionary 106 to find terminology that is unique to the identified target group or groups 208a, the output of the terminology generation process.

Such a comparison is made by taking each definition of each term in the specialized dictionary and searching for a matching definition in CLU dictionary. If no match exists, then it is determined that the term in the specialized dictionary is unique to written and verbal communications of the identified target group. Other possible outcomes of such a comparison are: no matching term in the CLU dictionary, thus indicating a new term; no matching usage of the term in the CLU dictionary, thus indicating a new use of the term; and a matching term and obscure usage of the term in the CLU dictionary, thus indicating an unexpected use of the term. Obscurity of term usage is determined by rank-ordering according to frequency of usage. Represented in these outcomes are uses of words, or new words, which are different from common language usage by a general population.

In one embodiment in which the system of the present invention is used to analyze a set of documents from a company, a plurality of lists is produced as output: a first list comprised of words for which there is no definition in CLU dictionary, a second list comprised of words that are used differently from those of instances of defined terms in CLU dictionary, and a third list comprised of words that are used in an unexpected manner. An expansion of each list would provide a list of context units that are typical of how the word is used by the target group, sub-document examples of how this word is used in expressions by the target group, and links to other communications of the target group in which this word is contained. This is so that a human judge can determine whether specialized terminology is used by the target group and what possible effects may ensue from business collaborations (e.g., SLAs, contracts).

In a second embodiment, electronic documents are processed to find specialized terminology of a target group; those words identified as such are highlighted, linked to a definition of how the word is used in a current context, and displayed in conjunction with information about the author of a document for consultation and further clarification.

Figure 3:
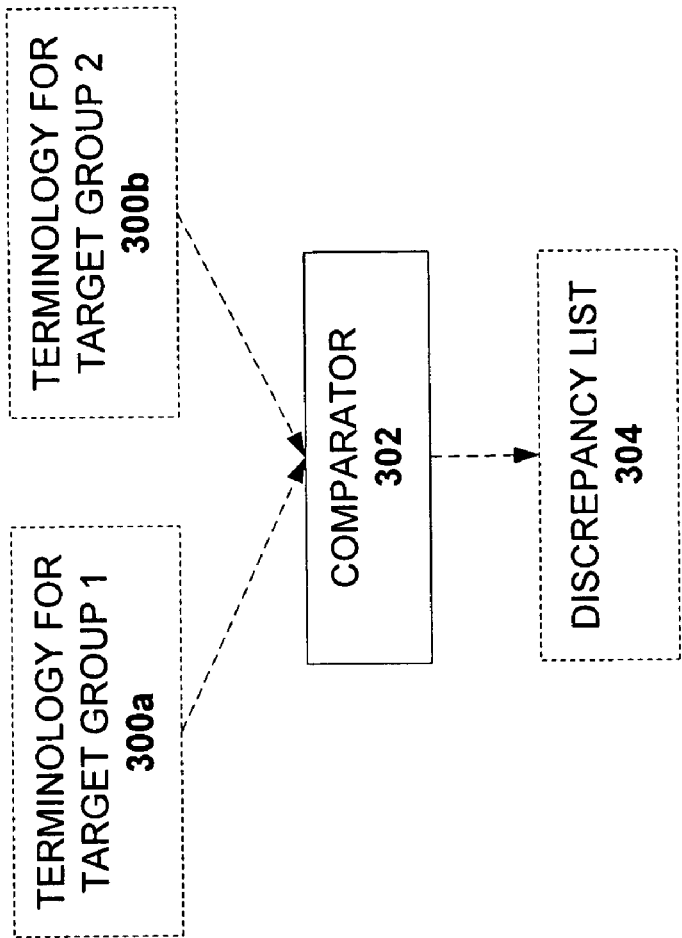
FIG. 3 illustrates the group co-ordination process.

Referring now to FIG. 3, a group coordination process is shown. Terminology from two separate groups 300a,b is compared in step 302, to determine discrepancies and any sources of confusion. Discrepancies are cases in which a term for one group is not a term for another group. Once a discrepancy list is created in step 304, it is used to facilitate coordination between one or more groups. In one embodiment, a discrepancy list can be used to highlight terminology in legal documents (e.g., SOWs, SLAs) and other contracts to attract special attention from those reviewing the documents. Further clauses are subsequently written to clearly define terms between which there is discrepancy, thus preempting a lawsuit. In another embodiment, a discrepancy list is used to translate documents from one group's terminology to another group's terminology. In yet another embodiment, communication made on behalf of a particular group is filtered with respect to group terminology such that it is appropriate for consumption by a general population. In other words, each word of the communication remaining after filtering has a corresponding definition in a CLU dictionary.

Additionally, the present invention provides for an article of manufacture comprising computer readable program code contained within implementing one or more modules to determine terminology associated with communications of a distinct subset of a general population. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) building a CLU dictionary from communications of a general population; (b) building a group dictionary based on communications of a distinct subset of a general population; and (c) determining group terminology based on term usage and frequency of usage from a CLU dictionary as compared with a group dictionary.

CONCLUSION

A system and method has been shown in the above embodiments for the effective implementation of a system and method for automatic terminology discovery. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program or computing environment.

The invention claimed is:

1. A method for discovering terminology unique to a specialized group that is a distinct subset of a general population, said terminology comprised of new terms as well as unique and obscure usages of previously known terms, said method comprising:
   a. analyzing a first collection of communications to identify at least one of: a source of communication and an instance of communication fit for consumption by said general population, said analyzing based on an ease of reading index;
   b. accessing a database of communications, based on said at least one of: a source of communication and an instance of communication, either extracted from said first collection or obtained from said source of communication;
   c. creating a first common language usage (CLU) dictionary from said database of communications, said CLU dictionary indicative of language expressions made by said general population, said CLU dictionary comprising terms, definitions corresponding to term usages, and frequencies corresponding to term usage;
   d. creating a second specialized usage dictionary from a second collection of communications intended for consumption by said specialized group that is a distinct subset of said general population, said second usage dictionary comprising terms, definitions corresponding to term usages, and frequencies corresponding to term usage, said definitions corresponding to term usages in said first CLU dictionary and said second specialized usage dictionary is based on a plurality of lexical units associated with a given term, with said lexical units being within a predetermined range bounded by ordinal positions before and after said given term, wherein said predetermined range is comprised of any of, or a combination of, the following: a sentence, paragraph, subsection, section, page, and document;
   e. comparing said second specialized usage dictionary associated with said specialized group that is a distinct subset of said general population with said first CLU dictionary associated with said general population to determine, for said first and second collections of communications: existence of terms not shared in common, differences in usage of terms shared in common, and disparities in frequencies of usages of terms shared in common; and
   f. establishing terminology unique to said specialized group that is a distinct subset of said general population, based on said comparative differences between said first CLU dictionary and said second specialized usage dictionary.

2. The method of claim 1, wherein said existence of terms not shared in common between both of said first CLU dictionary and second specialized usage dictionary determines a new term, unique to said distinct subset.

3. The method of claim 1, wherein said difference in usage of terms shared in common between said first CLU dictionary and second specialized usage dictionary determines a unique usage of a previously known term.

4. The method of claim 1, wherein said difference in frequencies of usages of terms shared in common between said first CLU dictionary and second specialized usage dictionary determines an obscure usage of a previously known term.

5. The method of claim 1, wherein said terminology unique to a distinct subset of a general population is highlighted, linked to an instance of contextual usage of said term, and linked to provide information regarding author of said instance of contextual usage.

6. The method of claim 1, wherein said terminology unique to a distinct subset of a general population is used to filter communication from said distinct subset such that said communication from said distinct subset is appropriate for consumption by a general population.

7. An article of manufacture comprising computer readable program code embodied on a computer readable storage medium therein which implements the discovery of terminology unique to a specialized group that is a distinct subset of a general population, said terminology comprised of new terms as well as unique and obscure usages of previously known terms; said medium storing computer readable program code executed by a computer, said medium comprising:
   a. computer readable program code analyzing a first collection of communications to identify at least one of: a source of communication and an instance of communication fit for consumption by said general population, said analyzing based on an ease or reading index;
   b. computer readable program code aiding in accessing a database of communications, based on said at least one of: a source of communication and an instance of communication, either extracted from said first collection or obtained from said source of communication;
   c. computer readable program code creating a first common language usage (CLU) dictionary, from said database of communications, said CLU dictionary indicative of language expressions made by said general population, said first CLU dictionary comprising terms, definitions corresponding to term usages, and frequencies corresponding to term usage;
   d. computer readable program code creating a second specialized usage dictionary from a second collection of communications intended for consumption by said specialized group that is a distinct subset of said general population, said second usage dictionary comprising terms, definitions corresponding to term usages, and frequencies corresponding to term usage, said definitions corresponding to term usages in said first CLU dictionary and said second specialized usage dictionary is based on a plurality of lexical units associated with a given term, with said lexical units being within a predetermined range bounded by ordinal positions before and after said given term, wherein said predetermined range is comprised of any of, or a combination of, the following: a sentence, paragraph, sub-section, section, page, and document;
   e. computer readable program code comparing said second specialized usage dictionary associated with said specialized group that is a distinct subset of said general population with said first CLU dictionary associated with said general population to determine, for said first and second collections of communications: existence of terms not shared in common, differences in usage of terms shared in common, and disparities in frequencies of usages of terms shared in common; and
   f. computer readable program code establishing terminology unique to said specialized group that is a distinct subset of said general population, based on said comparative differences between said first CLU dictionary and said second specialized usage dictionary.

8. The article of manufacture of claim 7, wherein said existence of terms not shared in common between both of said first CLU dictionary and second specialized usage dictionary determines a new term, unique to said distinct subset.

9. The article of manufacture of claim 7, wherein said difference in usage of terms shared in common between said first CLU dictionary and second specialized usage dictionary determines a unique usage of a previously known term.

10. The article of manufacture of claim 7, wherein said difference in frequencies of usages of terms shared in common between said first CLU dictionary and second specialized usage dictionary determines an obscure usage of a previously known term.

11. The article of manufacture of claim 7, wherein said terminology unique to a distinct subset of a general population is highlighted, linked to an instance of contextual usage of said term, and linked to provide information regarding author of said instance of contextual usage.

12. The article of manufacture of claim 7, wherein said terminology unique to a distinct subset of a general population is used to filter communication from said distinct subset such that said communication from said distinct subset is appropriate for consumption by a general population.

* * * * *